(No Model.)

B. MORRIS.
COFFIN LID OR COVER AND PROCESS OF MAKING THE SAME.

No. 297,528. Patented Apr. 22, 1884.

Attest:
F. F. Campbell
Edward G. Kempf

Inventor:
Benjamin Morris,
by Drake & Co.
Attys.

N. PETERS. Photo-Lithographer, Washington, D. C.

UNITED STATES PATENT OFFICE.

BENJAMIN MORRIS, OF NEWARK, NEW JERSEY.

COFFIN LID OR COVER AND PROCESS OF MAKING THE SAME.

SPECIFICATION forming part of Letters Patent No. 297,528, dated April 22, 1884.

Application filed February 16, 1884. (No model.)

*To all whom it may concern:*

Be it known that I, BENJAMIN MORRIS, a citizen of the United States, residing at Newark, in the county of Essex and State of New Jersey, have invented certain new and useful Improvements in Coffin Lids or Covers and Process of Making the Same; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to reduce the cost of manufacturing coffin covers or lids and to improve the finish of the same; and it consists in the method of construction, substantially as will be hereinafter set forth, and finally be embodied in the clauses of the claim.

Figure 1:
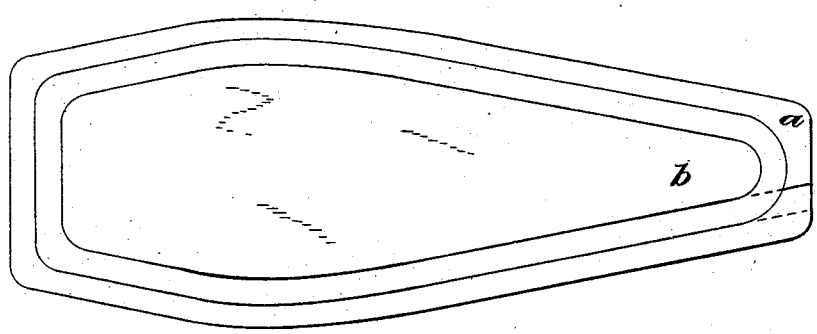
Figure 2:
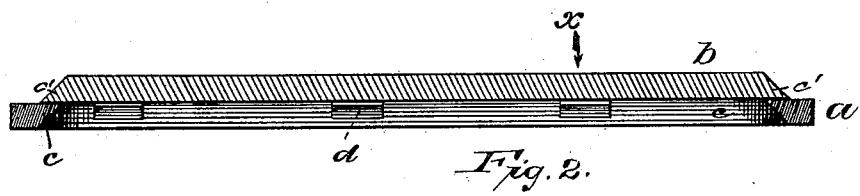
Figure 3:
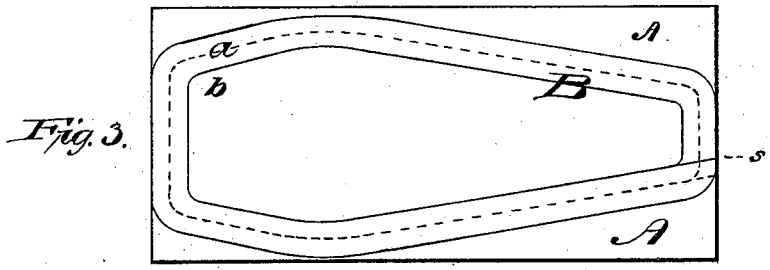
Figure 4:
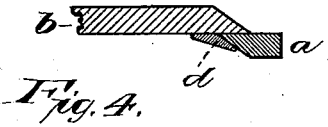

Referring to the accompanying drawings, in which similar letters of reference indicate like parts in each of the figures, Figure 1 is a plan of the coffin-lid; Fig. 2, a section of the same, taken longitudinally therethrough; Fig. 3, a plan of a board or blank from which the cover is sawed, and Fig. 4 a section through line $x$, Fig. 2.

In carrying out the invention I cut from the plank or board A, Fig. 3, a blank, B, having the form of a coffin lid or cover. Said blank is then cut with an inclined saw in a line back from but parallel with the edge of said blank, forming a band, $a$, and a center or top plate, $b$, which latter is allowed to fall or is removed from its surrounding band and placed upon the said band, as shown in Fig. 2, the acute angular edges $c\ c'$ overlapping. The saw in severing the plate $b$ from the band $a$ enters at any point, as at $s$, and makes a continuous inclined cut. The incision $s$ is readily closed and filled with glue, so that the appearance of the band is not marred. The parts $a\ b$ are next glued or otherwise fastened together, thus completing the cover.

Cleats or blocks $d$ may be employed to give greater security to the joint between the parts $a\ b$ or to strengthen the cover as a whole. The cover is thus constructed of one board, and no material is wasted, as has been heretofore when the surrounding band was composed of several mitered pieces. Increased beauty of finish is obtained by my construction, inasmuch as the top plate and band always agree in color and grain. The extraneous portions surrounding the blank may be cut away after the center or top plate is removed.

Having thus described the invention, what I claim as new is—

1. The method of manufacturing wooden covers, to wit: cutting out a center from a board with an inclined saw, removing said center and securing it upon the opposite side of said board from that from which said center was withdrawn, keeping the same faces of said parts uppermost, substantially as set forth.

2. The method of manufacturing lids or covers for coffins, to wit: cutting the blank from the board, then cutting out a center from said blank with an inclined saw so that the inner edge of the band thus formed and the outer edge of said center will be reciprocally beveled, then removing said center from its band and securing it upon the opposite side of said band from that from which it was withdrawn, all substantially as herein set forth.

In testimony that I claim the foregoing I have hereunto set my hand this 30th day of January, 1884.

BENJAMIN MORRIS.

Witnesses:
F. F. CAMPBELL,
OLIVER DRAKE.